INVENTOR.
GENNARO VOLLERO

BY Poppu, Bain o Bobis

ATTORNEYS

United States Patent Office 3,623,393
Patented Nov. 30, 1971

3,623,393
DEVICE FOR TEACHING MUSIC
Gennaro J. Vollero, 12 Sycamore St.,
Bloomfield, N.J. 07003
Filed July 11, 1969, Ser. No. 841,027
Int. Cl. G09b 15/02
U.S. Cl. 84—470                                          6 Claims

ABSTRACT OF THE DISCLOSURE

A device for teaching music including a housing having a window through which a continuous tape may be viewed, the tape bearing rows of notes representing various musical scales, three rows of light bulbs beneath the window and tape for selectively illuminating, by means of remote switches, each note in the row of notes on the tape as well as the indicia for a sharp above each note, and for a flat beneath each note, as well as means for transporting the tape without extinguishing the light bulbs.

BACKGROUND OF INVENTION

Classical music as well as most popular Western music is based upon the use of one or more or combinations of fifteen scales. These basic fifteen scales are C sharp, F sharp, B, E, A, D, G, C, F, B flat, E flat, A flat, D flat, G flat, and C flat. Most musical compositions may be derived from the use of thirteen notes in each of the aforementioned scales.

There are many vital interrelationships between the scales and the number of each particular note in each scale. For instance, most "major" scales are numerically derived from the first, third and fifth notes of the scales. Major seventh chords include progressions of the first, third, fifth and seventh note of each particular scale. Other scales are built up in a similar fashion on a numerical basis.

In order to teach musical composition, it is necessary that one understand the interrelationship between scales with respect to both notes and the sharps and flats of various notes. While the progression of notes from scale to scale may be orally explained, there is great need for one to visualize the change in notes in the various scales when transposing from scale to scale. For instance, if one is to start with the scale of C, which is generally regarded as the most simple, basic scale, the major scale of C is designated by the first, third and fifth notes of the scale. The first, third and fifth notes of the scale of C are respectively C, E, and G. A major seventh C chord comprises the first, third, fifth and seventh notes of the C scale respectively C, E, G, and B.

However, the next most common scale is the scale of F. The first, third and fifth notes of the scale of F are different from the first, third and fifth notes of the scale of C.

It would be very advantageous for one learning the scales to be able to visualize the first, third, and fifth notes of a particular scale and then immediately shift to a different scale, wherein the first, third and fifth notes of that scale would be automatically illuminated, illustrating the transition.

In the teaching device disclosed and claimed herein, a continuous tape bearing the notes of the fifteen more important scales in horizontal rows, is positioned to pass a window. Three rows of light bulbs are positioned beneath the tape, the tape being translucent. The three rows of bulbs are in vertical registration with each other and contain thirteen light bulbs each, representing the thirteen notes of each scale. Switch means are provided for manually illuminating and extinguishing each of the thirty-nine bulbs, the switches being similarly arranged in three rows of thirteen each.

Thus, one can position a particular scale in the window and illuminate selectively whatever notes are desired in that scale by operating the switches for the center row of lights. If the particular note should be a sharp or flat, the light bulb either above or beneath that note may be illuminated, which will illuminate the sharp or flat indicia printed on the tape above and beneath the rows of notes. Therefore, if a 1, 3, 5 progression of notes is to be illustrated, the first, third and fifth switches of the center row would be actuated to illuminate the first, third and fifth notes. The tape may then be transported to a new scale, wherein the first, third and fifth notes will be automatically illuminated. However, in some instances, it will be necessary to illuminate either the flat indicia or sharp indicia to indicate that a particular note should be a flat or sharp. In this manner, one may visualize and construct his own particular chords and scales and immediately visualize a change in the notes according to the change of the scale.

Similarly, one may test the ability of others to either identify or construct various chords by means of this device.

SUMMARY OF INVENTION

A device for teaching music comprising a housing having a window, a continuous tape transportable across said window, the tape bearing rows of notes, each row including the notes of a particular scale in the same numerical progression, the tape also bearing an indicia for a sharp and an indicia for a flat on the same opposed side of each note in each row, and means for independently and selectively illuminating each note, each indicia of a sharp and each indicia of a flat appearing in the window, together with means for transporting the tape without altering the status of illumination.

PREFERRED EMBODIMENT OF INVENTION

The objects and advantages aforesaid as well as other objects and advantages may be achieved by the device for teaching music, a preferred embodiment of which is illustrated in the drawings in which.

Figure 1:
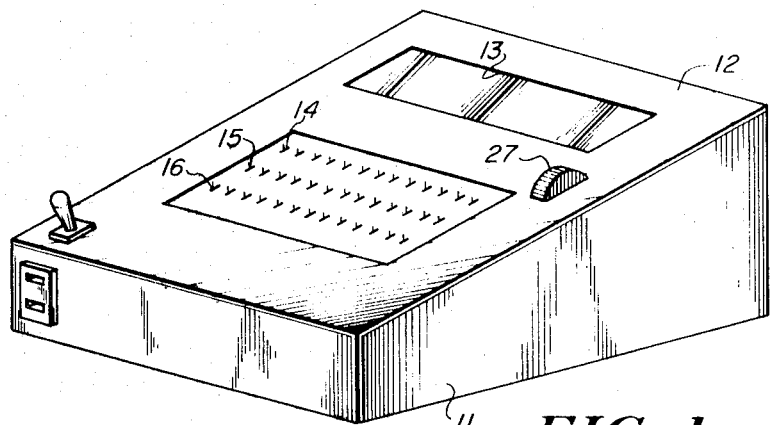
FIG. 1 is a view in perspective of the teaching device.
Figure 2:
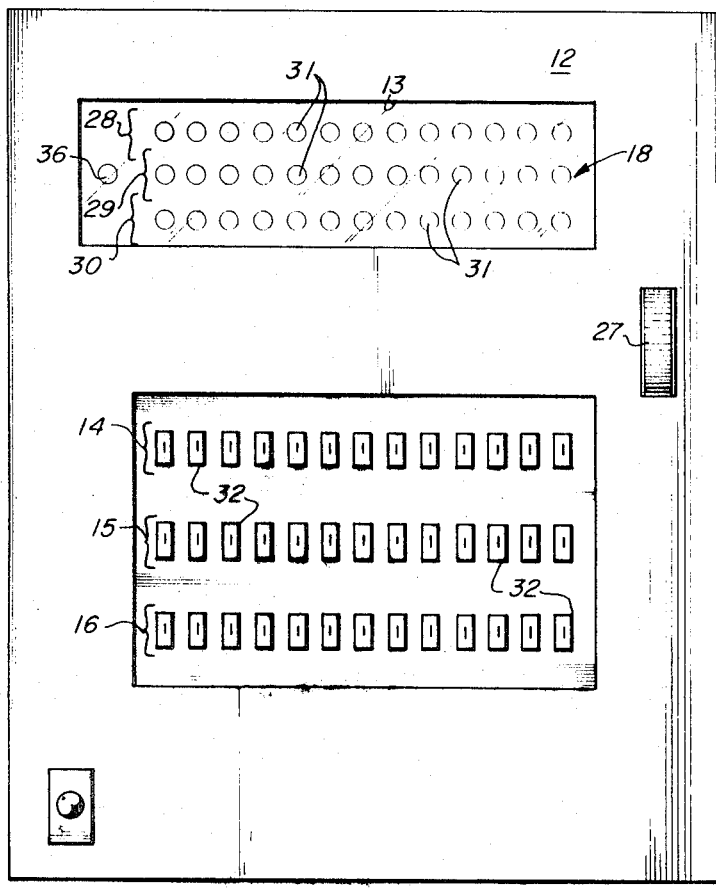
FIG. 2 is a top plan view of the teaching device showing a window with the transportable tape removed therefrom.
Figure 3:
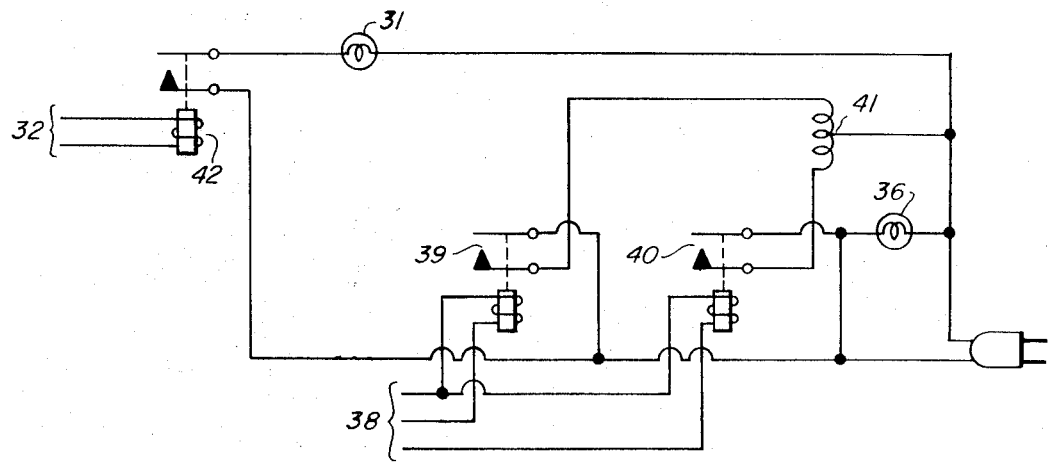
FIG. 3 is a schematic wiring diagram for the teaching device showing the wiring for one of the illumination means and the switch means controlling the illumination means.
Figure 4:
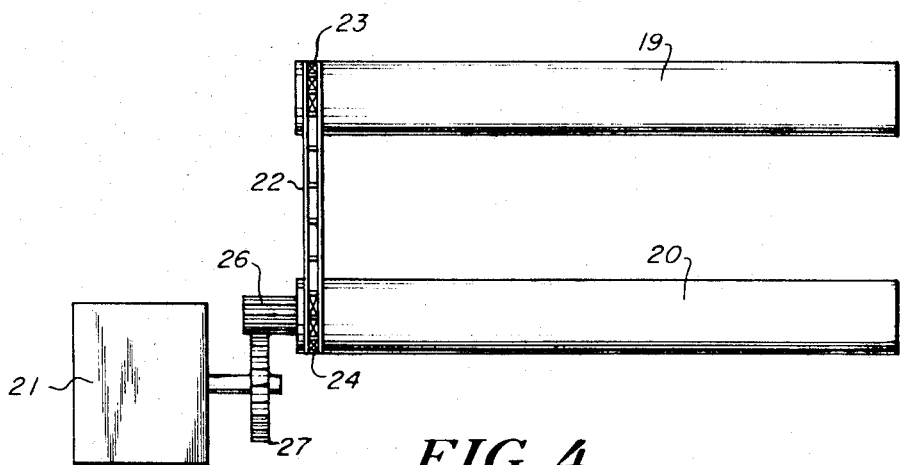
FIG. 4 is a top plan view of means for transporting the continuous tape showing the illumination means extending therebetween.
Figure 5:
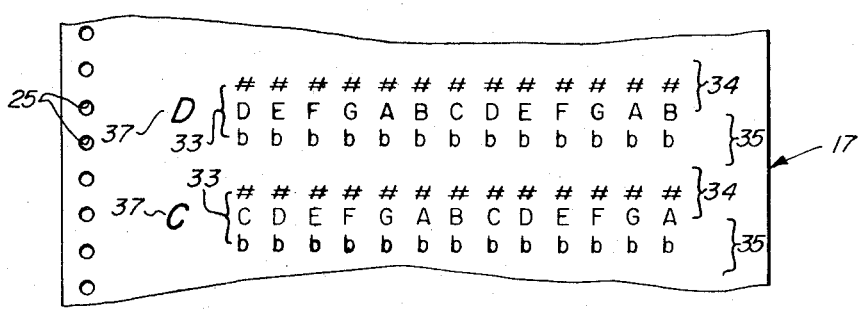
FIG. 5 is an exemplary portion of the continuous tape.

Referring now to the drawings in detail, the teaching device comprises a housing 11 having a top panel 12. The top panel 12 is provided with a generally rectangular window 13 and three rows of manually operated electrical switches respectively 14, 15, 16.

A continuous tape 17 is mounted in the housing 11 for transport past the window 13. A light panel 18 is mounted beneath the transportable tape 17 for individually and selectively illuminating portions of the tape in response to actuation of the switches in the various rows 14, 15, 16.

The means for transporting the tape 17 comprises a pair of rollers 19 and 20 which are located on opposite sides of the panel 18. One or both of the rollers 19 and 20 may be driven by means of a motor 21. In addition, a chain 22 permits roller 19 to be driven by roller 20. The tape 17 overlays the rollers 19, 20 and is maintained in precise timed relationship to rotation of the rollers by means of sprockets 23 on the end of roller 19 and sprockets 24 on the end of roller 20. The sprockets 23, 24 engage sprocket holes 25 in the tape 17. The particular means for transporting the tape shown and described herein is merely for purposes of illustration and many other equivalent means may be employed for transporting the tape 17 past the window 13 of the housing 11.

In addition, the tape 17 may be transported by means of a manual drive 26 connected to a knurled wheel 27 projecting through the top 12 of the housing 11. The manual drive may be engaged to one of the rollers 19 or 20 by means of a gear or a friction drive.

The light panel 18 comprises three separate rows of lights 28, 29, 30, each light bulb 31 in each of the rows 28, 29, 30 is controlled by a switch 32 in corresponding rows of switches 14, 15, 16, there being a number of switches equal to the number of light bulbs.

The tape 17 bears rows of notes 33, 33, etc. The notes in each row represent the notes in one particular scale of music. The tape 17 contains fifteen rows of notes representing the fifteen principal scales from which most Western music is derived. These scales are C sharp, F sharp, B, E, A, D, G, C, F, B flat, E flat, A flat, D flat, G flat, C flat. The numerical progression of each note in the respective scales is the same. That is, each row 33 of notes begins with the classically accepted first note of the particular scale. Each row 33 of notes also contains thirteen notes of that particular scale in numerical progression from one to thirteen. In addition, there is a row of indicia for a sharp 34 on one side of each of the rows 33 of notes as well as a row indicia for flats 35 on the opposite side of the rows 33 of notes. Each sharp and flat is in vertical registration with each note.

Each of the rows of lights 28, 29, 30 contain thirteen bulbs 31 each. The rows of lights 28, 29, 30 and the rows of notes, sharps and flats, respectively 33, 34, 35, are dimensioned so that when the tape 17 is transported above the panel 18, a light bulb 31 will lie simultaneously beneath each of the notes in row 33, each of the sharps in row 34, and each of the flats in row 35.

In addition, there is a pilot light 36 which will illuminate an indicia 37 on the tape 17 denoting the particular scale positioned above light row 29.

Referring now to the wiring diagram, a three-position switch 38 on the top 12 of the housing 11 is connected to relays 39, 40 controlling a reversible motor 21. The motor 21 drives the tape 17 in both directions according to the position of switch 38.

The switches 32 on the top 12 of the housing 11 control relays 42, 42, etc. for the respective light bulbs 31, each switch 32 controlling a corresponding light bulb 31.

In operation, a particular scale or row of notes 33 is brought into registration with the row 29 of lights beneath the window 13. The row 34 of sharp indicias and the row 35 of flat indicias will be in registration with rows of lights 28 and 30 respectively. The indicia 37 for the scale will be in registration with pilot light 36. If the major chord of that scale is desired, the first, third and fifth switches 32 of switch row 15 are operated illuminating the first, third and fifth notes of the particular scale. If an augmented chord is desired, the first, third, fifth and seventh switches 32 of switch row 15 are operated to illuminate the first, third, fifth and seventh light bulbs 31 of light bulb row 25, thereby illuminating the first, third, fifth and seventh notes of the particular scale showing in the window 13.

If one or more of the notes in row 33 should be a sharp or flat, the switch 32 controlling the light bulb 31 in either row 28 or row 30 is actuated, illuminating either the sharp or flat indicia above or beneath the particular note.

In order to observe the change of chords for a change of scales, switch 38 is actuated to transport the tape 17 to a new scale. The lights which were already illuminated remain illuminated during transport and now immediately illuminate the first, third, fifth or the first, third, fifth and seventh notes of the new scale, depending upon the particular chord which has been set up in lights. A knowledge of the particular chord will dictate whether or not additional sharp or flat indicias must be illuminated or extinguished.

Since there are numerical progressions for each of the particular types of chords commonly in use, one may construct on the teaching device any chord for any scale by merely actuating the proper switches 32 in row 15 in accordance with the numerical progression by which the particular chord is set up. This will in turn immediately illuminate the notes in any particular scale corresponding to that chord. The indicia for the sharps or flats are illuminated or extinguished according to the particular scale.

Not only may a teacher preset various scales and illustrate the interrelationships by transporting the tape 17, but also a pupil may be tested on his ability to construct scales by actuating the switches 32. Conversely, the pupil may be tested on his ability to recognize particular scales by reading the illumination of the tape 17.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

What is claimed:

1. A device for teaching music comprising,
   (a) a housing having a window,
   (b) indicia bearing means mountable in the housing beneath the window,
   (c) illuminating means for independently and selectively illuminating individual indicia on the indicia bearing means appearing in the window,
   (d) means for moving the indicia bearing means beneath the window without altering the status of illumination;
   (e) the indica bearing means having rows of indicia, the indicia in each row corresponding to the notes of a musical scale, each indicia in each row being functionally registrable with one of said illuminating means as the indicia bearing means are moved,
   (f) the notes of each row of indicia appearing in the same cyclical, alphabetical sequence beginning with the alphabetical letter denoting the key of the scale.

2. A device for teaching music comprising
   (a) the structure in accordance with claim 1 in which
   (b) the indicia bearing means is a continuous tape transportable past the window.

3. A device for teaching music comprising
   (a) the structure in accordance with claim 1 in which
   (b) the illuminating means are a plurality of lights equal in number to the number of indicia to be illuminated at any one time located beneath the indicia and in registration therewith.

4. A device for teaching music comprising,
   (a) the structure in accordance with claim 1 in which,
   (b) the indicia bearing means having rows of indicia, the indcia in each row corresponding to the notes of a musical scale, each indicia in each row being functionally registrable with one of said illuminating means as the indicia bearing means are moved, the notes of each row of indicia appearing in the same numerical sequence with respect to the chords of the scales,
   (c) an indicia for a flat and an indicia for a sharp on opposite sides of each note in each row, each indicia for a flat and a sharp being functionally in registration with illuminating means when the notes of the row with which they are associated are functionally in registration with illuminating means, and
   (d) means for illuminating independently and selectively each note in the row appearing in the window and each indicia for a flat and sharp associated with said row of notes; said indicia for flats and sharps appearing in the window simultneously with the row of notes associated therewith.

5. A device for teaching music comprising
(a) the structure in accordance with claim 4 in which
(b) the indicia bearing means is a continuous tape bearing parallel rows of notes and associated indicia for sharps and flats transportable past the window.

6. A device for teaching music comprising
(a) the structure in accordance with claim 5 in which
(b) the illuminating means are a plurality of lights equal in number to the number of notes in each row of notes and the indicia for sharps and flats associated therewith located beneath and in registration with said notes and indicia associated therewith, and
(c) means for transporting the tape past the window such that successive rows of notes and indicia for flats and sharps are registrable with the illuminating means.

References Cited

UNITED STATES PATENTS

| | | | |
|---|---|---|---|
| 1,268,376 | 6/1918 | Miessner et al. | 84—477 |
| 3,001,435 | 9/1961 | Duffy et al. | 84—474 |
| 3,429,217 | 2/1969 | Lawrence | 84—471 |

FOREIGN PATENTS

| | | | |
|---|---|---|---|
| 442,226 | 2/1936 | Great Britain | 84—470 |

RICHARD B. WILKINSON, Primary Examiner

L. R. FRANKLIN, Assistant Examiner